United States Patent
Li et al.

(10) Patent No.: US 11,489,448 B2
(45) Date of Patent: Nov. 1, 2022

(54) ISOLATED SWITCHING CONVERTER WITH HIGH FEEDBACK ACCURACY AND CONTROL METHOD

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 17/399,356

(22) Filed: Aug. 11, 2021

(65) Prior Publication Data
US 2022/0149740 A1   May 12, 2022

(30) Foreign Application Priority Data
Nov. 9, 2020 (CN) .......................... 202011240167.7

(51) Int. Cl.
H02M 3/335 (2006.01)
H02M 1/00 (2006.01)

(52) U.S. Cl.
CPC ..... H02M 3/33523 (2013.01); H02M 1/0016 (2021.05)

(58) Field of Classification Search
CPC .......................... H02M 1/0016; H02M 3/33523
See application file for complete search history.

(56) References Cited

U.S. PATENT DOCUMENTS

| | | | |
|---|---|---|---|
| 9,331,583 B2 | 5/2016 | Zhang et al. | |
| 10,432,104 B2 | 10/2019 | Li et al. | |
| 10,951,124 B2 | 3/2021 | Li et al. | |
| 2014/0177290 A1* | 6/2014 | Zhang | H02M 3/33507 363/21.13 |
| 2017/0288554 A1* | 10/2017 | Fahlenkamp | H02M 3/33592 |
| 2020/0161985 A1 | 5/2020 | Li et al. | |
| 2020/0287454 A1* | 9/2020 | Lee | G06F 13/4282 |
| 2021/0175790 A1 | 6/2021 | Ye et al. | |
| 2022/0149740 A1* | 5/2022 | Li | H02M 3/33523 |

FOREIGN PATENT DOCUMENTS

CN    102832806 A   * 12/2012

* cited by examiner

*Primary Examiner* — Kyle J Moody
*Assistant Examiner* — Lakaisha Jackson
(74) *Attorney, Agent, or Firm* — Perkins Coie LLP

(57) ABSTRACT

An isolated switching converter has a primary switch and a control circuit. The control circuit has a first sampling circuit, a second sampling circuit, a compensation circuit and a feedback control circuit. The first sampling circuit is coupled to an auxiliary winding of a transformer to receive a voltage on the auxiliary winding and is configured to generate a first feedback signal having an alternating current signal indicative of an output voltage. The second sampling circuit is coupled to the auxiliary winding through a first rectifier and is configured to generate a second feedback signal having a direct current signal indicative of the output voltage. The compensation circuit is configured to generate a compensation signal based on the first feedback signal, the second feedback signal and a reference threshold. The feedback control circuit is configured to generate a primary control signal of the primary switch based on the compensation signal.

16 Claims, 7 Drawing Sheets

ISOLATED SWITCHING CONVERTER WITH HIGH FEEDBACK ACCURACY AND CONTROL METHOD

CROSS-REFERENCE TO RELATED APPLICATIONS

This application claims the benefit of CN application No. 202011240167.7, filed on Nov. 9, 2020, and incorporated herein by reference.

TECHNICAL FIELD

The present invention generally relates to electronic circuits, and more particularly but not exclusively, to isolated switching converters, control circuits and associated control methods.

BACKGROUND

Isolated switching converters are widely used in various off-line power supplies and occasions with high security requirements, which typically require precise, high efficient, low electromagnetic interference (EMI) and low cost control strategies. Moreover, a feedback control is required to adjust the energy supplied to a load.

FIG. 1 is a traditional isolated switching converter 100 having an auxiliary winding used for a feedback control. As shown in FIG. 1, when a rectifier D1 is turned ON, a voltage Vf developed on the auxiliary winding of a transformer T1 is proportional to an output voltage Vout. So feedback information can be obtained by sensing the voltage Vf. The voltage Vf can be sensed to generate a first feedback signal VZCD. A compensation circuit 14 generates a compensation signal COMP based on the first feedback signal VZCD, and then a control circuit 15 generates a control signal DRV based on the compensation signal COMP, to control a primary switch MP.

The feedback control shown in FIG. 1 is simple and easy. However, there were some deficiencies in this feedback control. The first feedback signal VZCD can reflect the real output voltage Vout only during the conduction of the rectifier D1. The sampling to the first feedback signal VZCD is inaccurate when the rectifier D1 just starts to be turned ON due to ringing. For this reason, a blanking time can be set, and the first feedback signal VZCD can be sampled when the blanking time ends.

However, there were still some problems in some applications. On the one hand, if the blanking time is not long enough, the sampling to the first feedback signal VZCD will be the oscillation signal when the rectifier D1 is just turned ON. On the other hand, if the blanking time is too long, the sampling to the first feedback signal VZCD may be the signal after the conduction of the rectifier D1 ends. These sampling to the first feedback signal VZCD in above conditions are not accurate and may not reflect the real output voltage Vout.

SUMMARY

An embodiment of the present invention discloses an isolated switching converter comprising: a primary switch, a first sampling circuit, a second sampling circuit, a compensation circuit and a feedback control circuit. The isolated switching converter converts an input voltage into an output voltage. The primary switch is coupled to a transformer. The first sampling circuit is coupled to an auxiliary winding of the transformer to receive a voltage on the auxiliary winding and configured to generate a first feedback signal, wherein the first feedback signal comprises an alternating current signal indicative of the output voltage. The second sampling circuit is coupled to the auxiliary winding through a first rectifier, wherein the first rectifier has a positive terminal coupled to receive the voltage on the auxiliary winding and a negative terminal coupled to the second sampling circuit. The second sampling circuit is configured to generate a second feedback signal, wherein the second feedback signal comprises a direct current signal indicative of the output voltage. The compensation circuit is configured to receive the first feedback signal, the second feedback signal and a reference threshold, and generate a compensation signal based on the first feedback signal, the second feedback signal and the reference threshold. The feedback control circuit is coupled to the compensation circuit and is configured to generate a primary control signal to control the primary switch based on the compensation signal.

An embodiment of the present invention discloses a control method used in an isolated switching converter, the isolated switching converter converts an input voltage into an output voltage to drive a load. The isolated switching converter comprises a primary switch coupled to a transformer. The control method comprises the following steps: 1) generating a first feedback signal and a second feedback signal based on the voltage on an auxiliary winding of the transformer, wherein the first feedback signal comprises an alternating current signal indicative of the output voltage, and the second feedback signal comprises a direct current signal indicative of the output voltage; 2) generating a first feedback threshold and a second feedback threshold based on the second feedback signal, wherein the first feedback threshold is higher than the second feedback threshold; 3) generating a compensation signal based on the first feedback signal, the second feedback signal, a reference threshold, the first feedback threshold and the second feedback threshold; and 4) generating a primary control signal to control the primary switch based on the compensation signal. Wherein before the output voltage reaches a preset value, the compensation signal is generated based on the first feedback signal and the reference threshold. After the output voltage reaches the preset value, the compensation signal is generated based on the second feedback signal and the first feedback threshold when the second feedback signal is higher than the first feedback threshold. The compensation signal is generated based on the second feedback signal and the second feedback threshold when the second feedback signal is lower than the second feedback threshold, wherein the first feedback threshold is higher than the second feedback threshold.

An embodiment of the present invention discloses a control circuit used in an isolated switching converter, the isolated switching converter converts an input voltage into an output voltage to drive a load. The isolated switching converter comprises a primary switch coupled to a transformer. The control circuit comprises: a first sampling circuit, a second sampling circuit, a compensation circuit and a feedback control circuit. The first sampling circuit is coupled to an auxiliary winding of the transformer to receive a voltage on the auxiliary winding and is configured to generate a first feedback signal, wherein the first feedback signal comprises an alternating current signal indicative of the output voltage. The second sampling circuit is coupled to the auxiliary winding through a first rectifier, wherein the first rectifier has a positive terminal coupled to receive the voltage on the auxiliary winding and a negative terminal coupled to the second sampling circuit. The second sampling circuit is configured to generate a second feedback signal, wherein the second feedback signal comprises a direct current signal indicative of the output voltage. The compensation circuit is configured to receive the first feedback signal, the second feedback signal and a reference threshold, and generate a compensation signal based on the first feedback signal, the second feedback signal and the reference threshold. The feedback control circuit is coupled to the compensation circuit and configured to generate a primary control signal to control the primary switch based on the compensation signal. Before the output voltage reaches a preset value, the compensation circuit generates the compensation signal based on the first feedback signal and reference threshold. After the output voltage reaches the preset value, the compensation circuit generates the compensation signal based on the second feedback signal and the first feedback threshold when the second feedback signal is higher than the first feedback threshold. And the compensation circuit generates the compensation signal based on the second feedback signal and the second feedback threshold when the second feedback signal is lower than the second feedback threshold, wherein the first feedback threshold is higher than the second feedback threshold.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in an isolated switching converter. In the following detailed description, for simplicity, the specific working principle of the present invention is explained only by taking flyback converter as an example.

Figure 1:
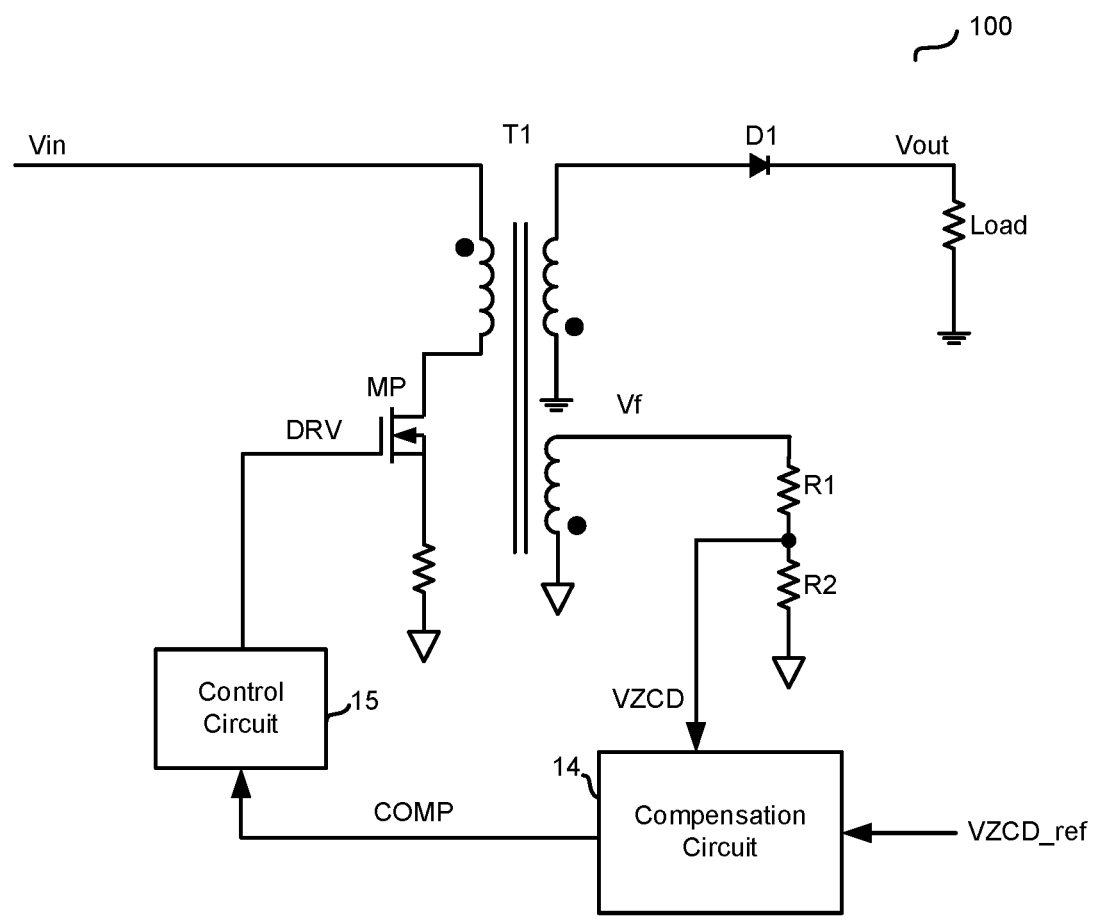
FIG. 1 is a traditional isolated switching converter 100 having an auxiliary winding used for feedback control.
Figure 2:
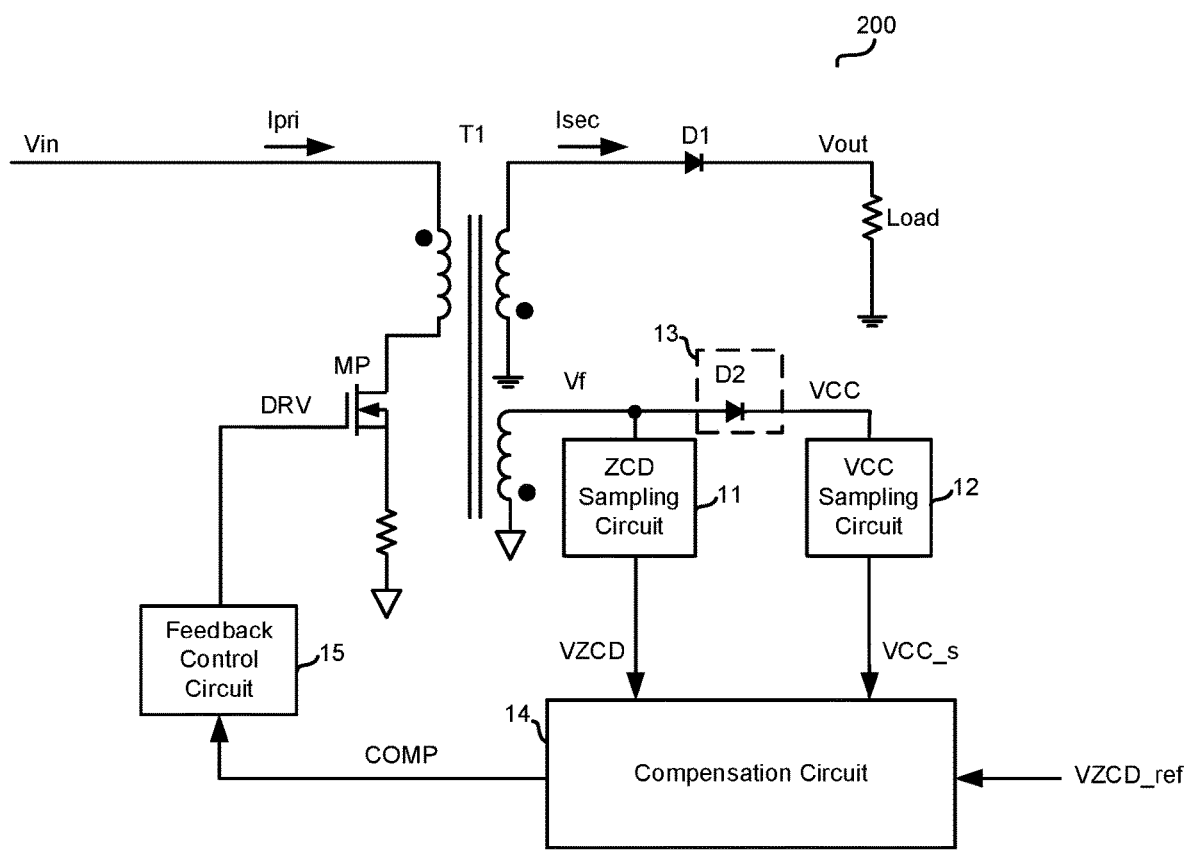
FIG. 2 is a block diagram of an isolated switching converter 200 in accordance with an embodiment of the present invention.

FIG. 2 is a block diagram of an isolated switching converter 200 in accordance with an embodiment of the present invention. The isolated switching converter 200 comprises a primary switch MP, a ZCD sampling circuit 11 (i.e., a first sampling circuit 11), a VCC sampling circuit 12 (i.e., a second sampling circuit 12), a compensation circuit 14 and a feedback control circuit 15. The primary switch MP is coupled to a transformer T1. The transformer T1 has a primary winding, a secondary winding and an auxiliary winding, wherein the primary winding is coupled to receive an input voltage Vin and an input current Pire, and the secondary winding is coupled to provide an output voltage Vought and an output current IPsec to a load.

In the example shown in FIG. 2, the ZCD sampling circuit 11 is coupled to the auxiliary winding and is configured to generate a first feedback signal VZCD indicative of the output voltage Vout based on a voltage Vf on the auxiliary winding, wherein the first feedback signal VZCD comprises an alternating current signal indicative the output voltage Vout of the switching converter 200. The VCC sampling circuit 12 is coupled to the auxiliary winding through a first rectifier 13 and is configured to generate a second feedback signal VCC_s indicative of the output voltage Vout based on the voltage Vf, wherein the second feedback signal VCC_s comprises a direct current signal indicative of the output voltage Vout. The compensation circuit 14 is configured to receive the first feedback signal VZCD, the second feedback signal VCC_s and a reference threshold VZCD_ref, and generate a compensation signal COMP based on the first feedback signal VZCD, the second feedback signal VCC_s and the reference threshold VZCD_ref. The feedback control circuit 15 is configured to generate a primary control signal DRV to control the primary switch MP. In the example shown in FIG. 2, the first rectifier 13 (e.g., a diode D2) has a positive terminal (e.g., anode of the diode D2) and a negative terminal (e.g., cathode of the diode D2), wherein the positive terminal is configured to receive the voltage Vf and the negative terminal is coupled to the VCC sampling circuit 12.

In the example shown in FIG. 2, before the output voltage Vout reaches a preset value, the compensation circuit 14 generates the compensation signal COMP based on the first feedback signal VZCD and the reference threshold VZCD_ref. After the output voltage Vout reaches the preset value, the compensation circuit 14 optionally generates the compensation signal COMP based on the second feedback signal VCC_s. For example, when the second feedback signal VCC_s is higher than a first feedback threshold, the compensation circuit 14 generates the compensation signal COMP based on the second feedback signal VCC_s and the first feedback threshold. When the second feedback signal VCC_s is lower than a second feedback threshold, the compensation circuit 14 generates the compensation signal COMP based on the second feedback signal VCC_s and the second feedback threshold. And when the second feedback signal VCC_s is lower than the first feedback threshold and higher than the second feedback threshold, the compensation circuit 14 generates the compensation signal COMP based on the first feedback signal VZCD and the reference threshold VZCD_ref, wherein the first feedback threshold is higher than the second feedback threshold.

Figure 3:
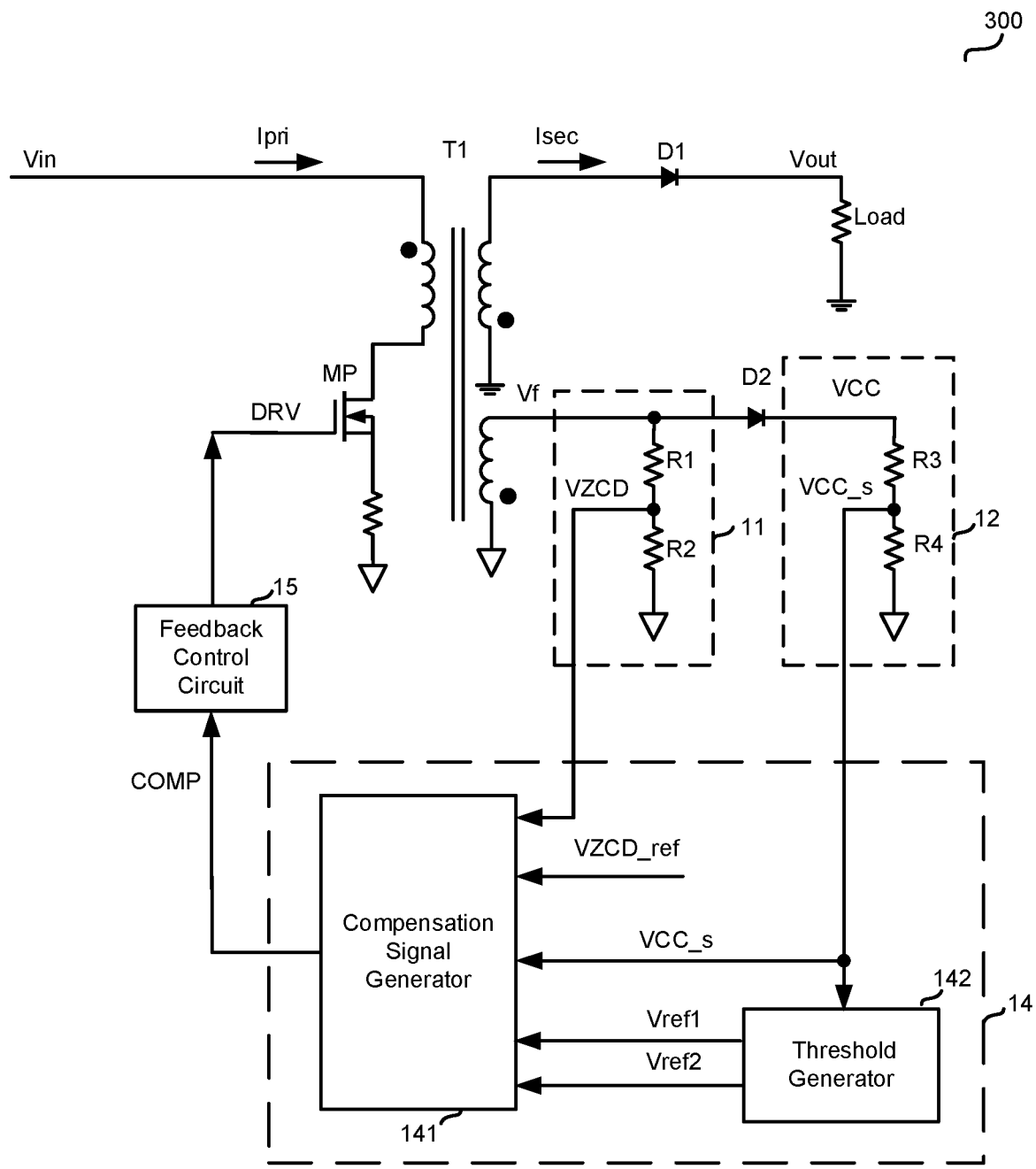
FIG. 3 is a block diagram of an isolated switching converter 300 in accordance with another embodiment of the present invention.

FIG. 3 is a block diagram of an isolated switching converter 300 in accordance with another embodiment of the present invention. In the example shown in FIG. 3, the ZCD sampling circuit 11 comprises two resistors R1 and R2 connected in series, the first feedback signal VZCD can be a voltage signal outputted by a first voltage divider consisted of the resistors R1 and R2, wherein the first voltage divider is used to divide the voltage Vf. In one embodiment, the VCC sampling circuit 12 comprises two resistors R3 and R4 connected in series. The second feedback signal VCC_s can be a voltage signal outputted by a second voltage divider consisted of the resistors R3 and R4, wherein the second voltage divider is used to divide a voltage VCC, and the voltage VCC is a rectified voltage that is provided by configuring the diode D1 to rectify the voltage Vf. In the example shown in FIG. 3, the compensation circuit 14 comprises a compensation signal generator 141 and a threshold generator 142. In one embodiment, after the output voltage Vout reaches the preset value, based on the second feedback signal VCC_s at a preset time, the threshold generator 142 generates a first feedback threshold Vref1 and a second feedback threshold Vref2. In one embodiment, the first feedback threshold Vref1 is equal to the second feedback signal VCC_s at 1.2 times of the preset time, and the second feedback threshold Vref2 is equal to the second feedback signal VCC_s at 0.8 times of the preset time. In applications, the specific settings can be determined according to actual needs. In one embodiment, before the output voltage Vout reaches the preset value, the compensation signal generator 141 generates the compensation signal COMP based on the first feedback signal VZCD and the reference threshold VZCD_ref.

After the output voltage Vout reaches the preset value, based on the second feedback signal VCC_s, the compensation signal generator 141 generates the compensation signal COMP optionally. In detail, the compensation signal generator 141 generates the compensation signal COMP based on the second feedback signal VCC_s and the first feedback threshold Vref1 when the second feedback signal VCC_s is higher than the first feedback threshold Vref1. The compensation signal generator 141 generates the compensation signal COMP based on the second feedback signal VCC_s and the second feedback threshold Vref2 when the second feedback signal VCC_s is lower than the second feedback threshold Vref2. And the compensation signal generator 141 generates the compensation signal COMP based on the first feedback signal VZCD and the reference threshold VZCD_ref when the second feedback signal VCC_s is lower than the first feedback threshold Vref1 and higher than the second feedback threshold Vref2. In one embodiment, the first feedback threshold Vref1 is higher than the second feedback threshold Vref2.

In the example shown in FIG. 2 or FIG. 3, the primary switch MP is N-type MOSFET. However, those skilled in the art should understand that the primary switch MP can be P-type MOSFET or any other suitable controllable semiconductor device in other embodiments.

Figure 4:
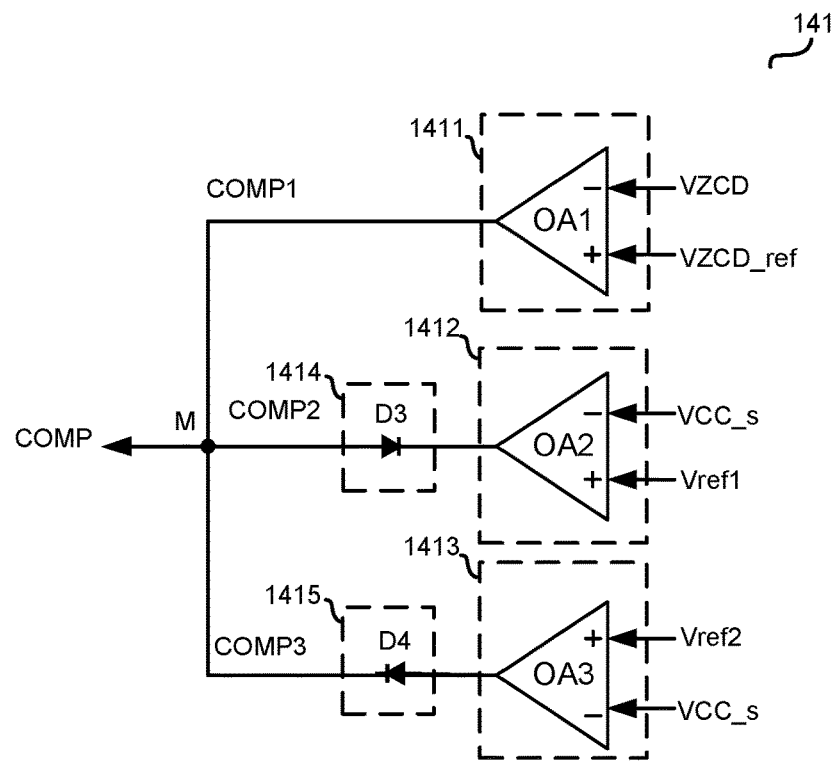
FIG. 4 is a block diagram of a compensation signal generator 141 shown in FIG. 3, in accordance with an embodiment of the present invention.

FIG. 4 is a block diagram of a compensation signal generator 141 shown in FIG. 3, in accordance with an embodiment of the present invention. In the example shown in FIG. 4, the compensation signal generator 141 comprises a first operational amplifier 1411 (e.g., an operational amplifier OA1), a second operational amplifier 1412 (e.g., an operational amplifier OA2) and a third operational amplifier 1413 (e.g., an operational amplifier OA3). The first operational amplifier 1411 has a non-inverting input terminal, an inverting input terminal and an output terminal. The non-inverting input terminal receives the reference threshold VZCD_ref, the inverting input terminal receives the first feedback signal VZCD, and the output terminal outputs a first regulating signal COMP1. The second operational amplifier 1412 has a non-inverting input terminal, an inverting input terminal and an output terminal. The non-inverting input terminal of the second operational amplifier 1412 receives the first feedback threshold Vref1, the inverting input terminal of the second operational amplifier 1412 receives the second feedback signal VCC_s, and the output terminal of the second operational amplifier 1412 outputs a second regulating signal COMP2. The third operational amplifier 1413 has a non-inverting input terminal, an inverting input terminal and an output terminal. The non-inverting input terminal of the third operational amplifier 1413 receives the second feedback threshold Vref2, the inverting input terminal of the third operational amplifier 1413 receives the second feedback signal VCC_s, and the output terminal of the third operational amplifier 1413 outputs a third regulating signal COMP3. In one embodiment, based on the first regulating signal COMP1, the second regulating signal COMP2 and the third regulating signal COMP3, the compensation signal generator 141 generates the compensation signal COMP.

In the example shown in FIG. 4, the compensation signal generator 141 further comprises a second rectifier 1414 (e.g., a diode D3) and a third rectifier 1415 (e.g., a diode D4). The second rectifier 1414 has a positive terminal and a negative terminal, the negative terminal of the second rectifier 1414 is coupled to the output terminal of the second operational amplifier 1412 to receive the second regulating signal COMP2. The third rectifier 1415 has a positive terminal and a negative terminal, the positive terminal of the third rectifier 1415 is coupled to the output terminal of the third operational amplifier 1413 to receive the third regulating signal COMP3. In one embodiment, the output terminal of the first operational amplifier 1411, the positive terminal of the second rectifier 1414 and the negative terminal of the third rectifier 1415 are coupled to a common terminal to output the compensation signal COMP. In one embodiment, the sink current capacity and souring current capacity of the second operational amplifier 1412 and the third operational amplifier 1413 are higher than those of the first operational amplifier 1411.

Figure 5:
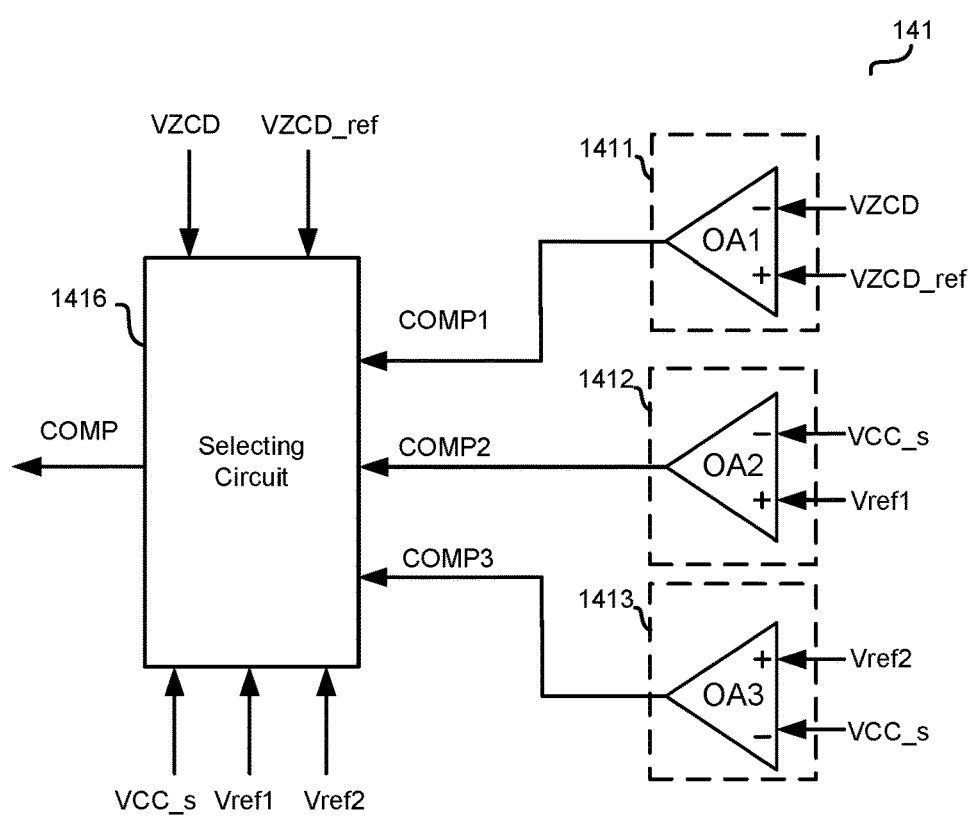
FIG. 5 is a block diagram of a compensation signal generator 141 shown in FIG. 3, in accordance with another embodiment of the present invention.

FIG. 5 is a block diagram of a compensation signal generator 141 shown in FIG. 3, in accordance with another embodiment of the present invention. In the example shown in FIG. 5, the compensation signal generator 141 comprises a first operational amplifier 1411 (e.g., an operational amplifier OA1), a second operational amplifier 1412 (e.g., an operational amplifier OA2) and a third operational amplifier 1413 (e.g., an operational amplifier OA3). The first operational amplifier 1411 has a non-inverting input terminal, an inverting input terminal and an output terminal, wherein the non-inverting input terminal receives the reference threshold VZCD_ref, the inverting input terminal receives the first feedback signal VZCD, and the output terminal outputs a first regulating signal COMP1. The second operational amplifier 1412 has a non-inverting input terminal, an inverting input terminal and an output terminal, wherein the non-inverting input terminal receives the first feedback threshold Vref1, the inverting input terminal receives the second feedback signal VCC_s, and the output terminal of the second operational amplifier 1412 outputs a second regulating signal COMP2. The third operational amplifier 1413 has a non-inverting input terminal, an inverting input terminal and an output terminal, wherein the non-inverting input terminal receives the second feedback threshold Vref2, the inverting input terminal receives the second feedback signal VCC_s, and the output terminal of the third operational amplifier 1413 outputs a third regulating signal COMP3. In an embodiment, based on the first regulating signal COMP1, the second regulating signal COMP2 and the third regulating signal COMP3, the compensation signal generator 141 generates the compensation signal COMP.

In the example shown in FIG. 5, the compensation signal generator 141 further comprises a selecting circuit 1416. The selecting circuit 1416 receives the first regulating signal COMP1, the second regulating signal COMP2, the third regulating signal COMP3, the first feedback signal VZCD, the reference threshold VZCD_ref, the second feedback signal VCC_s, the first feedback threshold Vref1 and the second feedback threshold Vref2, and outputs the compensation signal COMP. The selecting circuit 1416 is configured to select the first regulating signal COMP1 as the compensation signal COMP when the second feedback signal VCC_s is lower than the first feedback threshold Vref1 and higher than the second feedback threshold Vref2. The selecting circuit 1416 is configured to select the second regulating signal COMP2 as the compensation signal COMP when the second feedback signal VCC_s is higher than the first feedback threshold Vref1. And the selecting circuit 1416 is further configured to select the third regulating signal COMP3 as the compensation signal COMP when the second feedback signal VCC_s is lower than the second feedback threshold Vref2.

Figure 6:
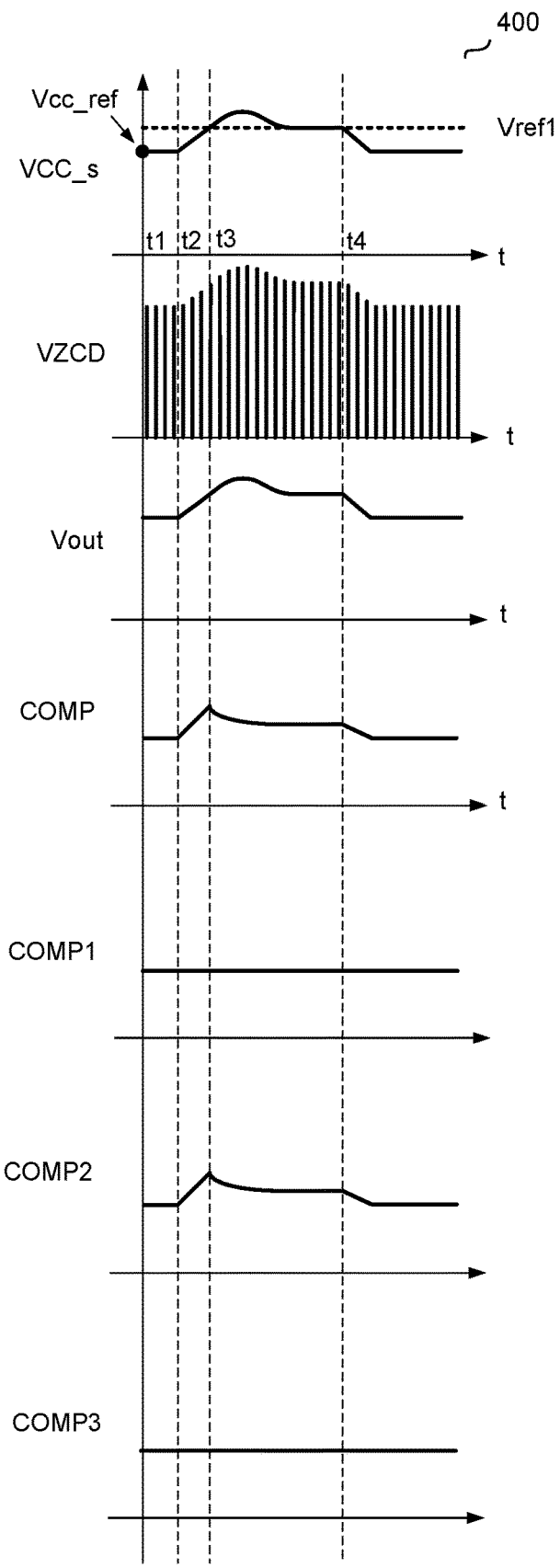
FIG. 6 is a working waveform 400 of an isolated switching converter 300 shown in FIG. 3, in accordance with an embodiment of the present invention.

FIG. 6 is a working waveform 400 of an isolated switching converter 300 shown in FIG. 3, in accordance with an embodiment of the present invention. When the second feedback signal VCC_s reaches a voltage Vcc_ref at time t1, the threshold generator 142 samples the voltage Vcc_ref and generates the first feedback threshold Vref1 and the second feedback threshold Vref2, based on the voltage Vcc_ref. In one embodiment, the time t1 is configured as a preset time, Vref1=1.2 Vcc_ref, Vref2=0.8 Vcc_ref.

In some applications, the first feedback signal VZCD can not reflect the output voltage Vout correctly due to unreasonable sampling position of Vout, so the output voltage Vout increases. The output voltage Vout increases at time t2, the second feedback signal VCC_s increases too, while the first regulating signal COMP1 remains unchanged. At this time, the second feedback signal VCC_s is lower than the first feedback threshold Vref1 and higher than the second feedback threshold Vref2, the compensation signal generator 141 generates the first regulating signal COMP1 as the compensation signal COMP based on the first feedback signal VZCD and the reference threshold VZCD_ref.

Then the second feedback signal VCC_s is higher than the first feedback threshold Vref1 at time t3, the compensation signal generator 141 generates the second regulating signal COMP2 as the compensation signal COMP based on the second feedback signal VCC_s and the first feedback threshold Vref1.

At time t4, the abnormal state is restored, and the first feedback signal VZCD can reflect the output voltage Vout correctly, so the output voltage Vout starts decreasing and the second feedback signal VCC_s decreases too. When the second feedback signal VCC_s is lower than the first feedback threshold Vref1, the compensation signal generator 141 generates the first regulating signal COMP1 as the compensation signal COMP based on the first feedback signal VZCD and the reference threshold VZCD_ref.

Figure 7:
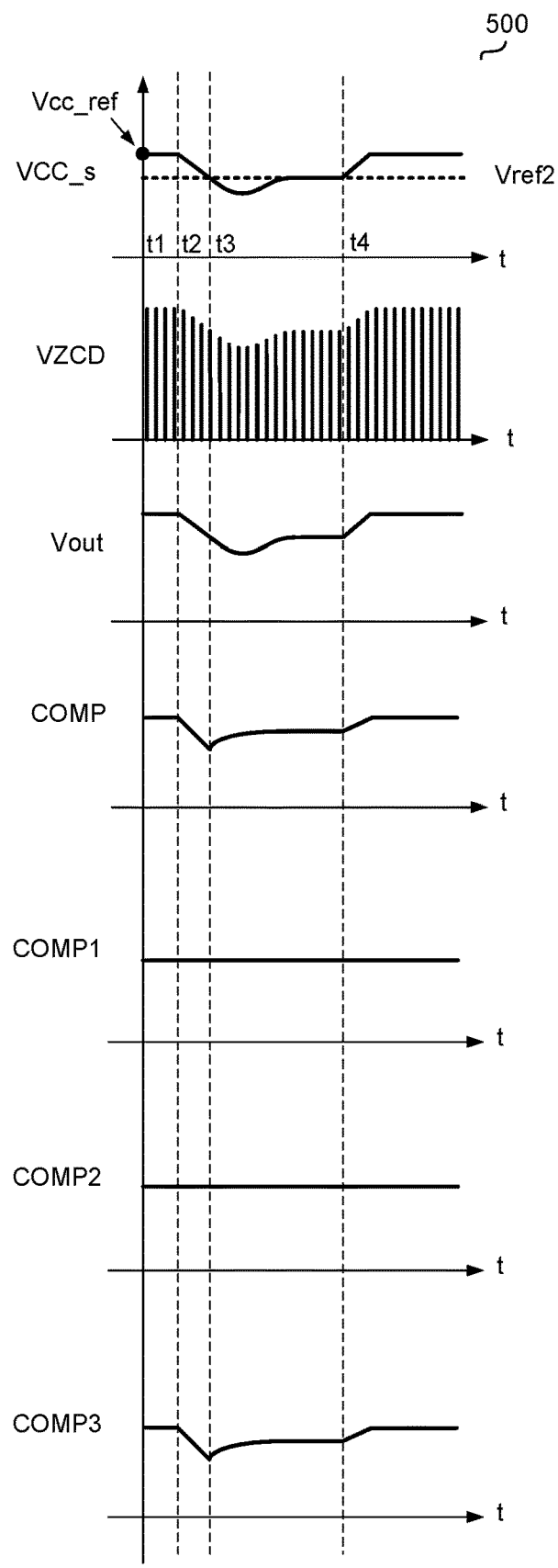
FIG. 7 is a working waveform 500 of an isolated switching converter 300 shown in FIG. 3, in accordance with another embodiment of the present invention.

FIG. 7 is a working waveform 500 of an isolated switching converter 300 shown in FIG. 3, in accordance with another embodiment of the present invention. When the second feedback signal VCC_s reaches a voltage Vcc_ref at time t1, the threshold generator 142 samples the voltage Vcc_ref and generates the first feedback threshold Vref1 and the second feedback threshold Vref2 based on the voltage Vcc_ref. In one embodiment, the time t1 is configured as a preset time, Vref1=1.2 Vcc_ref, Vref2=0.8 Vcc_ref.

In some applications, the first feedback signal VZCD can not reflect the output voltage Vout correctly due to unreasonable sampling position of Vout, so the output voltage Vout decreases. The output voltage Vout decreases at time t2, and the second feedback signal VCC_s decreases too, while the first regulating signal COMP1 remains unchanged. At this time, the second feedback signal VCC_s is lower than the first feedback threshold Vref1 and higher than the second feedback threshold Vref2, the compensation signal generator 141 generates the first regulating signal COMP1 as the compensation signal COMP based on the first feedback signal VZCD and the reference threshold VZCD_ref.

Then the second feedback signal VCC_s is lower than the second feedback threshold Vref2 at time t3, and the compensation signal generator 141 generates the third regulating signal COMP3 as the compensation signal COMP based on the second feedback signal VCC_s and the second feedback threshold Vref2.

At time t4, the abnormal state is restored, and the first feedback signal VZCD can reflect the output voltage Vout correctly, so the output voltage Vout starts increasing, and the second feedback signal VCC_s increases too. When the second feedback signal VCC_s is higher than the second feedback threshold Vref2, the compensation signal generator 141 generates the first regulating signal COMP1 as the compensation signal COMP based on the first feedback signal VZCD and the reference threshold VZCD_ref.

Figure 8:
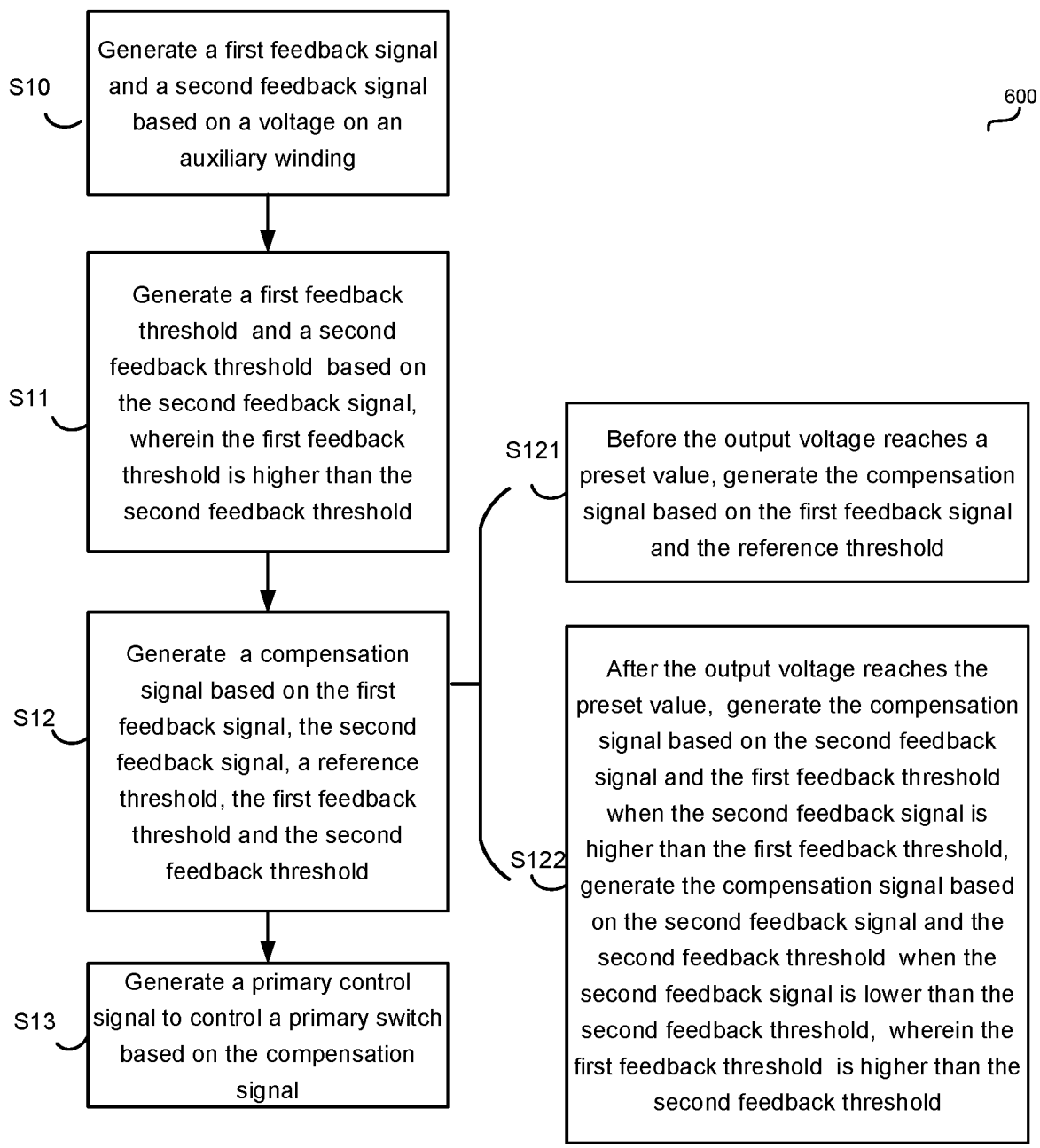
FIG. 8 is a working flowchart 600 of a control method used in an isolated switching converter, in accordance with an embodiment of the present invention.

FIG. 8 is a working flowchart 600 of a control method used in an isolated switching converter, in accordance with an embodiment of the present invention. The isolated switching converter converts an input voltage into an output voltage and comprises a primary switch coupled to a transformer. The control method includes steps S10~S13.

At step S10, a first feedback signal and a second feedback signal are generated based on a voltage on an auxiliary winding of the transformer, wherein the first feedback signal comprises an alternating current signal indicative of the output voltage, the second feedback signal comprises a direct current signal indicative of the output voltage.

At step S11, a first feedback threshold and a second feedback threshold are generated based on the second feedback signal, wherein the first feedback threshold is higher than the second feedback threshold. In one embodiment, the step S11 comprises after the output voltage reaches a preset value, the first feedback threshold and the second feedback threshold are generated based on the second feedback signal at a preset time.

At step S12, a compensation signal is generated based on the first feedback signal, the second feedback signal, a reference threshold, the first feedback threshold and the second feedback threshold. In one embodiment, the step S12 further comprises step S121 and step S122. At step S121, before the output voltage reaches a preset value, the compensation signal is generated based on the first feedback signal and the reference threshold. At step S122, after the voltage reaches the preset value, the compensation signal is generated based on the second feedback signal and the first feedback threshold when the second feedback signal is higher than the first feedback threshold. And the compensation signal is generated based on the second feedback signal and the second feedback threshold when the second feedback signal is lower than the second feedback threshold, wherein the first feedback threshold is higher than the second feedback threshold.

At step S13, a primary control signal is generated to control the primary switch based on the compensation signal.

In one embodiment, the control method further comprises: after the output voltage reaches the preset value, the compensation signal is generated based on the first feedback signal and the reference threshold when the second feedback signal is higher than the second feedback threshold and lower than the first feedback threshold.

Although many detailed circuits are shown in the embodiments above, it is apparent to persons of ordinary skills in the art that, these detailed circuits are only used for illustration purpose only, and are not intended to limit the present invention. Other suitable circuit structure with same or similar function could also be utilized. Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An isolated switching converter converting an input voltage into an output voltage, comprising:
   a primary switch coupled to a transformer;
   a first sampling circuit coupled to an auxiliary winding of the transformer to receive a voltage on the auxiliary winding and configured to generate a first feedback signal, wherein the first feedback signal comprises an alternating current signal indicative of the output voltage;
   a second sampling circuit coupled to the auxiliary winding through a first rectifier and configured to generate a second feedback signal, wherein the first rectifier has a positive terminal to receive the voltage on the auxiliary winding and a negative terminal coupled to the second sampling circuit, the second feedback signal comprises a direct current signal indicative of the output voltage;
   a compensation circuit configured to receive the first feedback signal, the second feedback signal and a reference threshold, wherein based on the first feedback signal, the second feedback signal and the reference threshold, the compensation circuit is configured to generate a compensation signal; and
   a feedback control circuit coupled to the compensation circuit to receive the compensation signal, wherein based on the compensation signal, the feedback control circuit is configured to generate a primary control signal for controlling the primary switch; wherein
   before the output voltage reaches a preset value, the compensation circuit generates the compensation signal based on the first feedback signal and the reference threshold; and wherein
   after the output voltage reaches the preset value, the compensation circuit generates the compensation signal based on the second feedback signal and a first feedback threshold when the second feedback signal is higher than the first feedback threshold, the compensation circuit generates the compensation signal based on the second feedback signal and a second feedback threshold when the second feedback signal is lower than the second feedback threshold, wherein the first feedback threshold is higher than the second feedback threshold.

2. The isolated switching converter of claim 1, wherein the compensation circuit comprises:
   a compensation signal generator configured to generate the compensation signal based on the first feedback signal, the reference threshold, the second feedback signal, the first feedback threshold and the second feedback threshold, the compensation signal generator comprises:
   a first operational amplifier having a non-inverting input terminal, an inverting input terminal and an output terminal, wherein the non-inverting input terminal receives the reference threshold, the inverting input terminal receives the first feedback signal, and the output terminal outputs a first regulating signal;
   a second operational amplifier having a non-inverting input terminal, an inverting input terminal and an output terminal, wherein the non-inverting input terminal receives the first feedback threshold, the inverting input terminal receives the second feedback signal, and the output terminal outputs a second regulating signal;
   a third operational amplifier having a non-inverting input terminal, an inverting input terminal and an output terminal, wherein the non-inverting input terminal receives the second feedback threshold, the inverting input terminal receives the second feedback signal, and the output terminal outputs a third regulating signal; and wherein
   the compensation signal generator generates the compensation signal based on the first regulating signal, the second regulating signal and the third regulating signal.

3. The isolated switching converter of claim 2, wherein the compensation circuit further comprises:
- a second rectifier having a positive terminal and a negative terminal, wherein the negative terminal is coupled to the output terminal of the second operational amplifier to receive the second regulating signal;
- a third rectifier having a positive terminal and a negative terminal, wherein the positive terminal is coupled to the output terminal of the third operational amplifier to receive the third regulating signal; and wherein
- the output terminal of the first operational amplifier, the positive terminal of the second rectifier and the negative terminal of the third rectifier are coupled to a common terminal, and the common terminal outputs the compensation signal.

4. The isolated switching converter of claim 2, wherein a sink current capacity and a sourcing current capacity of the second operational amplifier and the third operational amplifier are higher than those of the first operational amplifier.

5. The isolated switching converter of claim 2, wherein the compensation signal generator further comprises a selecting circuit, the selecting circuit is configured to receive the first regulating signal, the second regulating signal, the third regulating signal, the first feedback signal, the reference threshold, the second feedback signal, the first feedback threshold and the second feedback threshold, wherein:
- the selecting circuit is configured to select the first regulating signal as the compensation signal when the second feedback signal is lower than the first feedback threshold and higher than the second feedback threshold;
- the selecting circuit is configured to select the second regulating signal as the compensation signal when the second feedback signal is higher than the first feedback threshold; and
- the selecting circuit is configured to select the third regulating signal as the compensation signal when the second feedback signal is lower than the second feedback threshold.

6. The isolated switching converter of claim 1, wherein when the second feedback signal is lower than the first feedback threshold and higher than the second feedback threshold, the compensation circuit generates the compensation signal based on the first feedback signal and the reference threshold.

7. The isolated switching converter of claim 1, wherein the compensation circuit further comprises a threshold generator, wherein after the output voltage reaches the preset value, the threshold generator is configured to generate the first feedback threshold and the second feedback threshold based on the second feedback signal at a preset time.

8. A control method used in an isolated switching converter, wherein the isolated switching converter converts an input voltage into an output voltage and has a primary switch coupled to a transformer, the control method comprising:
- generating respectively a first feedback signal and a second feedback signal based on a voltage on an auxiliary winding of the transformer, wherein the first feedback signal comprises an alternating current signal indicative of the output voltage, and the second feedback signal comprises a direct current signal indicative of the output voltage;
- generating a first feedback threshold and a second feedback threshold based on the second feedback signal, wherein the first feedback threshold is higher than the second feedback threshold;
- generating a compensation signal based on the first feedback signal, the second feedback signal, a reference threshold, the first feedback threshold and the second feedback threshold;
- generating a primary control signal to control the primary switch based on the compensation signal; wherein
- before the output voltage reaches a preset value, generating the compensation signal based on the first feedback signal and the reference threshold; and
- after the output voltage reaches the preset value, generating the compensation signal based on the second feedback signal and the first feedback threshold when the second feedback signal is higher than the first feedback threshold, generating the compensation signal based on the second feedback signal and the second feedback threshold when the second feedback signal is lower than the second feedback threshold, wherein the first feedback threshold is higher than the second feedback threshold.

9. The control method of claim 8, wherein after the output voltage reaches the preset value, generating the compensation signal based on the first feedback signal and the reference threshold when the second feedback signal is lower than the first feedback threshold and higher than the second feedback threshold.

10. The control method of claim 8, wherein generating the first feedback threshold and the second feedback threshold based on the second feedback signal comprises:
- after the output voltage reaches the preset value, generating the first feedback threshold and the second feedback threshold based on the second feedback signal at a preset time.

11. A control circuit used in an isolated switching converter, wherein the isolated switching converter converts an input voltage into an output voltage and has a primary switch coupled to a transformer, the control circuit comprising:
- a first sampling circuit coupled to an auxiliary winding of the transformer to receive a voltage on the auxiliary winding and configured to generate a first feedback signal;
- a second sampling circuit coupled to the auxiliary winding through a first rectifier and configured to generate a second feedback signal, wherein the first rectifier has a positive terminal to receive the voltage on the auxiliary winding and a negative terminal coupled to the second sampling circuit;
- a compensation circuit configured to receive the first feedback signal, the second feedback signal and a reference threshold, and to generate a compensation signal based on the first feedback signal, the second feedback signal and the reference threshold;
- a feedback control circuit coupled to the compensation circuit and configured to generate a primary control signal to control the primary switch based on the compensation signal; wherein
- before the output voltage reaches a preset value, the compensation circuit generates the compensation signal based on the first feedback signal and the reference threshold; and
- after the output voltage reaches the preset value, the compensation circuit generates the compensation signal based on the second feedback signal and a first feedback threshold when the second feedback signal is higher than the first feedback threshold, the compensation circuit generates the compensation signal based on the second feedback signal and a second feedback threshold when the second feedback signal is lower than the second feedback threshold, wherein the first feedback threshold is higher than the second feedback threshold.

12. The control circuit of claim 11, wherein after the output voltage reaches the preset value, the compensation circuit generates the compensation signal based on the first feedback signal and the reference threshold when the second feedback signal is lower than the first feedback threshold and higher than the second feedback threshold.

13. The control circuit of claim 11, wherein the compensation circuit comprises:
  a threshold generator, wherein after the output voltage reaches the preset value, the threshold generator is configured to generate the first feedback threshold and the second feedback threshold based on the second feedback signal at a preset time;
  a first operational amplifier having a non-inverting input terminal, an inverting input terminal and an output terminal, wherein the non-inverting input terminal receives the reference threshold, the inverting input terminal receives the first feedback signal, and the output terminal outputs a first regulating signal;
  a second operational amplifier having a non-inverting input terminal, an inverting input terminal and an output terminal, wherein the non-inverting input terminal receives the first feedback threshold, the inverting input terminal receives the second feedback signal, and the output terminal outputs a second regulating signal;
  a third operational amplifier having a non-inverting input terminal, an inverting input terminal and an output terminal, wherein the non-inverting input terminal receives the second feedback threshold, the inverting input terminal receives the second feedback signal, and the output terminal outputs a third regulating signal; and wherein
  the compensation circuit generates the compensation signal based on the first regulating signal, the second regulating signal and the third regulating signal.

14. The control circuit of claim 13, wherein the compensation circuit further comprises:
  a second rectifier having a positive terminal and a negative terminal, wherein the negative terminal is coupled to the output terminal of the second operational amplifier to receive the second regulating signal;
  a third rectifier having a positive terminal and a negative terminal, wherein the positive terminal is coupled to the output terminal of the third operational amplifier to receive the third regulating signal; and wherein
  the output terminal of the first amplifier, the positive terminal of the second rectifier and the negative terminal of the third rectifier are coupled to a common terminal, and the common terminal outputs the compensation signal.

15. The control circuit of claim 13, wherein a sink current capacity and a sourcing current capacity of the second operational amplifier and the third operational amplifier are higher than those of the first operational amplifier.

16. The control circuit of claim 13, wherein the compensation circuit further comprises a selecting circuit, the selecting circuit is configured to receive the first regulating signal, the second regulating signal, the third regulating signal, the first feedback signal, the reference threshold, the second feedback signal, the first feedback threshold and the second feedback threshold, wherein
  the selecting circuit is configured to select the first regulating signal as the compensation signal when the second feedback signal is lower than the first feedback threshold and higher than the second feedback threshold;
  the selecting circuit is configured to select the second regulating signal as the compensation signal when the second feedback signal is higher than the first feedback threshold; and
  the selecting circuit is configured to select the third regulating signal as the compensation signal when the second feedback signal is lower than the second feedback threshold.

* * * * *